United States Patent
Draper et al.

(10) Patent No.: US 9,515,485 B1
(45) Date of Patent: *Dec. 6, 2016

(54) POWER CONTROL SYSTEM WITH POWER DROP OUT IMMUNITY AND UNCOMPROMISED STARTUP TIME

(71) Applicant: KONINKLIJKE PHILIPS N.V., Eindhoven (NL)

(72) Inventors: William A. Draper, Austin, TX (US); John L. Melanson, Austin, TX (US); Zhaohui He, Austin, TX (US)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 596 days.

This patent is subject to a terminal disclaimer.

(21) Appl. No.: 13/926,298

(22) Filed: Jun. 25, 2013

Related U.S. Application Data (63) Continuation of application No. 12/650,547, filed on Dec. 31, 2009, now Pat. No. 8,487,591.

(51) Int. Cl.
*H02J 9/00* (2006.01)
*H02J 1/10* (2006.01)
(Continued)

(52) U.S. Cl.
CPC .......... *H02J 1/10* (2013.01); *H02J 7/345* (2013.01); *H02J 9/00* (2013.01); *H02J 9/04* (2013.01)

(58) Field of Classification Search
CPC ..................................... H02J 9/00; H02J 9/04
See application file for complete search history.

(56) References Cited

U.S. PATENT DOCUMENTS

| 3,790,878 A | 2/1974 | Brokaw |
| 4,677,366 A | 6/1987 | Wilkinson et al. |

(Continued)

FOREIGN PATENT DOCUMENTS

| EP | 0536535 A1 | 4/1993 |
| EP | 0636889 A1 | 1/1995 |

(Continued)

OTHER PUBLICATIONS

Maksimovic, et al, Impact of Digital Control in Power Electronics, International Symposium on Power Semiconductor Devices and ICS, 2004, pp. 2-22, Boulder, Colorado, USA.

(Continued)

*Primary Examiner* — Jared Fureman
*Assistant Examiner* — Joel Barnett (57) ABSTRACT

A power control system provides immunity from power supply dropout for a controller without compromising a startup time of the controller. In at least one embodiment, the power control system includes separate startup and dropout immunity capacitors. In at least one embodiment, selection of the capacitance of the startup capacitor is independent of selection of the capacitance of the dropout immunity capacitance. In at least one embodiment, the startup capacitance can be minimized to provide sufficient energy for the controller to normally operate during one missed cycle of an input voltage and, thus, provide a minimum startup time for the controller. The capacitance of the dropout immunity capacitor can be maximized to provide sufficient energy for the controller to operate normally during a time period longer than one cycle of the input voltage.

19 Claims, 6 Drawing Sheets

(51) Int. Cl.
*H02J 7/34* (2006.01)
*H02J 9/04* (2006.01)

(56) References Cited

U.S. PATENT DOCUMENTS

| | | |
|---|---|---|
| 4,683,529 A | 7/1987 | Bucher |
| 4,737,658 A | 4/1988 | Kronmuller et al. |
| 4,739,462 A | 4/1988 | Farnsworth et al. |
| 4,937,728 A | 6/1990 | Leonardi |
| 4,940,929 A | 7/1990 | Williams |
| 4,977,366 A | 12/1990 | Powell |
| 5,001,620 A | 3/1991 | Smith |
| 5,003,454 A | 3/1991 | Bruning |
| 5,055,746 A | 10/1991 | Hu et al. |
| 5,109,185 A | 4/1992 | Ball |
| 5,173,643 A | 12/1992 | Sullivan et al. |
| 5,264,780 A | 11/1993 | Bruer et al. |
| 5,278,490 A | 1/1994 | Smedley |
| 5,383,109 A | 1/1995 | Maksimovic et al. |
| 5,424,932 A | 6/1995 | Inou et al. |
| 5,430,635 A | 7/1995 | Liu |
| 5,479,333 A | 12/1995 | McCambridge et al. |
| 5,481,178 A | 1/1996 | Wilcox et al. |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,783,909 A | 7/1998 | Hochstein |
| 5,798,635 A | 8/1998 | Hwang et al. |
| 5,808,453 A | 9/1998 | Lee |
| 5,874,725 A | 2/1999 | Yamaguchi |
| 5,960,207 A | 9/1999 | Brown |
| 5,994,885 A | 11/1999 | Wilcox et al. |
| 6,043,633 A | 3/2000 | Lev et al. |
| 6,084,450 A | 7/2000 | Smith et al. |
| 6,087,816 A * | 7/2000 | Volk .................. H02M 3/1582 323/222 |
| 6,091,233 A | 7/2000 | Hwang et al. |
| 6,160,724 A | 12/2000 | Hemena et al. |
| 6,229,292 B1 | 5/2001 | Redl et al. |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus |
| 6,343,026 B1 | 1/2002 | Perry |
| 6,356,040 B1 | 3/2002 | Preis et al. |
| 6,445,600 B2 | 9/2002 | Ben-Yaakov |
| 6,469,484 B2 | 10/2002 | L'Hermite et al. |
| 6,510,995 B2 | 1/2003 | Muthu et al. |
| 6,531,854 B2 | 3/2003 | Hwang |
| 6,580,258 B2 | 6/2003 | Wilcox et al. |
| 6,583,550 B2 | 6/2003 | Iwasa |
| 6,628,106 B1 | 9/2003 | Batarseh et al. |
| 6,657,417 B1 | 12/2003 | Hwang |
| 6,696,803 B2 | 2/2004 | Tao et al. |
| 6,724,174 B1 | 4/2004 | Esteves et al. |
| 6,768,655 B1 | 7/2004 | Yang et al. |
| 6,781,351 B2 | 8/2004 | Mednik et al. |
| 6,839,247 B1 | 1/2005 | Yang |
| 6,882,552 B2 | 4/2005 | Telefus et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,975,523 B2 | 12/2005 | Kim et al. |
| 6,980,446 B2 | 12/2005 | Simada et al. |
| 7,072,191 B2 | 7/2006 | Nakao et al. |
| 7,099,163 B1 | 8/2006 | Ying |
| 7,161,816 B2 | 1/2007 | Shteynberg et al. |
| 7,221,130 B2 | 5/2007 | Ribeiro et al. |
| 7,233,135 B2 | 6/2007 | Noma et al. |
| 7,257,008 B2 | 8/2007 | Yang |
| 7,266,001 B1 | 9/2007 | Notohamiprodjo et al. |
| 7,292,013 B1 | 11/2007 | Chen et al. |
| 7,295,452 B1 | 11/2007 | Liu et al. |
| 7,411,379 B2 | 8/2008 | Chu et al. |
| 7,554,473 B2 | 6/2009 | Melanson |
| 7,606,532 B2 | 10/2009 | Wuidart |
| 7,667,986 B2 | 2/2010 | Artusi et al. |
| 7,684,223 B2 | 3/2010 | Wei |
| 7,719,246 B2 | 5/2010 | Melanson |
| 7,719,248 B1 | 5/2010 | Melanson |
| 7,746,043 B2 | 6/2010 | Melanson |
| 7,804,480 B2 | 9/2010 | Jeon et al. |
| 7,834,553 B2 | 11/2010 | Hunt et al. |
| 7,872,883 B1 | 1/2011 | Elbanhawy |
| 7,894,216 B2 | 2/2011 | Melanson |
| 7,948,780 B2 | 5/2011 | Sonobe |
| 8,008,898 B2 | 8/2011 | Melanson et al. |
| 8,076,920 B1 * | 12/2011 | Melanson .......... H02M 1/4208 315/247 |
| 8,129,959 B1 | 3/2012 | Balogh |
| 8,169,806 B2 | 5/2012 | Sims et al. |
| 8,193,717 B2 | 6/2012 | Leiderman |
| 8,222,772 B1 | 7/2012 | Vinciarelli |
| 8,242,764 B2 | 8/2012 | Shimizu et al. |
| 8,369,109 B2 | 2/2013 | Niedermeier et al. |
| 8,441,210 B2 | 5/2013 | Shteynberg et al. |
| 8,487,591 B1 * | 7/2013 | Draper ..................... H02J 7/00 320/166 |
| 8,536,799 B1 | 9/2013 | Grisamore et al. |
| 8,610,364 B2 | 12/2013 | Melanson et al. |
| 2001/0033501 A1 | 10/2001 | Nebrigic |
| 2003/0090252 A1 | 5/2003 | Hazucha |
| 2003/0111969 A1 | 6/2003 | Konishi et al. |
| 2003/0160576 A1 | 8/2003 | Suzuki |
| 2003/0174520 A1 | 9/2003 | Bimbaud |
| 2003/0214821 A1 | 11/2003 | Giannopoulos et al. |
| 2003/0223255 A1 | 12/2003 | Ben-Yaakov |
| 2004/0046683 A1 | 3/2004 | Mitamura et al. |
| 2004/0196672 A1 | 10/2004 | Amei |
| 2005/0024898 A1 * | 2/2005 | Yang ................ H02M 3/33507 363/21.12 |
| 2005/0057237 A1 | 3/2005 | Clavel |
| 2005/0207190 A1 | 9/2005 | Gritter |
| 2005/0231183 A1 | 10/2005 | Li et al. |
| 2005/0270813 A1 | 12/2005 | Zhang et al. |
| 2005/0275354 A1 | 12/2005 | Hausman |
| 2006/0013026 A1 | 1/2006 | Frank et al. |
| 2006/0022648 A1 | 2/2006 | Zeltser |
| 2006/0214603 A1 | 9/2006 | Oh et al. |
| 2007/0103949 A1 | 5/2007 | Tsuruya |
| 2008/0018261 A1 | 1/2008 | Kastner |
| 2008/0043504 A1 | 2/2008 | Ye |
| 2008/0062584 A1 | 3/2008 | Freitag et al. |
| 2008/0062586 A1 | 3/2008 | Apfel |
| 2008/0117656 A1 | 5/2008 | Clarkin |
| 2008/0130336 A1 | 6/2008 | Taguchi |
| 2008/0175029 A1 | 7/2008 | Jung et al. |
| 2008/0259655 A1 | 10/2008 | Wei et al. |
| 2008/0278132 A1 | 11/2008 | Kesterson et al. |
| 2008/0310194 A1 | 12/2008 | Huang et al. |
| 2009/0059632 A1 | 3/2009 | Li et al. |
| 2009/0067204 A1 | 3/2009 | Ye et al. |
| 2009/0108677 A1 | 4/2009 | Walter et al. |
| 2009/0184665 A1 | 7/2009 | Ferno |
| 2009/0189586 A1 * | 7/2009 | Tiew ...................... H02M 3/07 323/288 |
| 2009/0295300 A1 | 12/2009 | King |
| 2010/0128501 A1 | 5/2010 | Huang et al. |
| 2010/0238689 A1 | 9/2010 | Fei et al. |
| 2010/0244793 A1 | 9/2010 | Caldwell |
| 2011/0110132 A1 | 5/2011 | Rausch et al. |
| 2011/0141775 A1 * | 6/2011 | Wang ..................... H02M 1/36 363/49 |
| 2011/0199793 A1 | 8/2011 | Kuang et al. |
| 2011/0276938 A1 | 11/2011 | Perry et al. |
| 2011/0291583 A1 | 12/2011 | Shen |
| 2011/0309760 A1 | 12/2011 | Beland et al. |
| 2012/0146540 A1 | 6/2012 | Khayat et al. |
| 2012/0187997 A1 | 7/2012 | Liao et al. |

(56) References Cited

U.S. PATENT DOCUMENTS

| | | |
|---|---|---|
| 2012/0248998 A1 | 10/2012 | Yoshinaga |
| 2012/0320640 A1 | 12/2012 | Baurle et al. |
| 2013/0181635 A1 | 7/2013 | Ling |
| 2014/0218978 A1 | 8/2014 | Heuken et al. |

FOREIGN PATENT DOCUMENTS

| | | |
|---|---|---|
| EP | 1213823 A2 | 6/2002 |
| EP | 1289107 A3 | 8/2002 |
| EP | 1962263 A2 | 8/2008 |
| EP | 2232949 | 9/2010 |
| EP | 2257124 A1 | 12/2010 |
| JP | 2008053181 A | 3/2006 |
| WO | 01/84697 A2 | 11/2001 |
| WO | 2004/051834 A1 | 6/2004 |
| WO | 2006013557 A1 | 2/2006 |
| WO | 2006/022107 A1 | 3/2006 |
| WO | 2007016373 A3 | 2/2007 |
| WO | 2008/004008 A2 | 1/2008 |
| WO | 2008152838 A2 | 12/2008 |
| WO | 2010011971 A1 | 1/2010 |
| WO | 2010065598 A2 | 6/2010 |
| WO | 2011008635 A1 | 1/2011 |

OTHER PUBLICATIONS

Fairchild Semiconductor, Ballast Control IC, FAN 7711, Rev. 1.0.3, 2007, pp. 1-23, San Jose, California, USA.

Yao, Gang et al, Soft Switching Circuit for Interleaved Boost Converters, IEEE Transactions on Power Electronics, vol. 22, No. 1, Jan. 2007, pp. 1-8, Hangzhou China.

Stmicroelectronics, Transition Mode PFC Controller, Datasheet L6562, Rev. 8, Nov. 2005, pp. 1-16, Geneva, Switzerland.

Zhang, Wanfeng et al, A New Duty Cycle Control Strategy for Power Factor Correction and FPGA Implementation, IEEE Transactions on Power Electronics, vol. 21, No. 6, Nov. 2006, pp. 1-10, Kingston, Ontario, Canada.

Stmicroelectronics, Power Factor Connector L6561, Rev 16, Jun. 2004, pp. 1-13, Geneva, Switzerland.

Texas Instruments, Avoiding Audible Noise at Light Loads When Using Leading Edge Triggered PFC Converters, Application Report SLUA309A, Mar. 2004—Revised Sep. 2004, pp. 1-4, Dallas, Texas, USA.

Texas Instruments, Startup Current Transient of the Leading Edge Triggered PFC Controllers, Application Report SLUA321, Jul. 2004, pp. 1-4, Dallas, Texas, USA.

Texas Instruments, Current Sense Transformer Evaluation UCC3817, Application Report SLUA308, Feb. 2004, pp. 1-3, Dallas, Texas, USA.

Texas Instruments, BiCMOS Power Factor Preregulator Evaluation Board UCC3817, User's Guide, SLUU077C, Sep. 2000—Revised Nov. 2002, pp. 1-10, Dallas, Texas, USA.

Texas Instruments, Interleaving Continuous Conduction Mode PFC Controller, UCC28070, SLUS794C, Nov. 2007—Revised Jun. 2009, pp. 1-45, Dallas, Texas, USA.

Texas Instruments, 350-W Two-Phase Interleaved PFC Pre-regulator Design Review, Application Report SLUA369B, Feb. 2005—Revised Mar. 2007, pp. 1-22, Dallas, Texas, USA.

Texas Instruments, Average Current Mode Controlled Power Factor Correction Converter using TMS320LF2407A, Application Report SPRA902A, Jul. 2005, pp. 1-15, Dallas, Texas, USA.

Texas Instruments, Transition Mode Pfc Controller, UCC28050, UCC28051, UCC38050, UCC38051, Application Note SLUS515D, Sep. 2002—Revised Jul. 2005, pp. 1-28, Dallas, Texas, USA.

Unitrode, High Power-Factor Preregulator, UC1852, UC2852, UC3852, Feb. 5, 2007, pp. 1-8, Merrimack, Maine, USA.

Unitrode, Optimizing Performance in UC3854 Power Factor Correction Applications, Design Note DN 39E, 1999, pp. 1-6, Merrimack, Maine, USA.

On Semiconductor Four Key Steps to Design a Continuous Conduction Mode PFC Stage Using the NCP1653, Application Note AND81841D, Nov. 2004, pp. 1-8, Phoenix, AZ, USA.

Unitrode, BiCMOS Power Factor Preregulator, Texas Instruments, UCC2817, UCC2818, UCC3817, UCC3818, SLUS3951, Feb. 2000—Revised Feb. 2006, pp. 1-25, Dallas, Texas, USA.

Unitrode, UC3854A/B and UC3855A/B Provide Power Limiting with Sinusoidal Input Current for PFC Front Ends, SLUA196A, Design Note DN-66, Jun. 1995—Revised Nov. 2001, pp. 1-6, Merrimack, Maine, USA.

Unitrode, Programmable Output Power Factor Preregulator, UCC2819, UCC3819, SLUS482B, Apr. 2001—Revised Dec. 2004, pp. 1-16, Merrimack, Maine, USA.

Texas Instruments, UCC281019, 8-Pin Continuous Conduction Mode (CCM) PFC Controller, SLU828B, Revised Apr. 2009, pp. 1-48, Dallas, Texas, USA.

http://toolbarpdf.com/docs/functions-and-features-of=inverters. html, Jan. 20, 2011, pp. 1-8.

Zhou, Jinghai, et al, Novel Sampling Algorithm for DSP Controlled 2kW PFC Converter, IEEE Transactions on Power Electronics, vol. 16, No. 2, Mar. 2001, pp. 1-6, Hangzhou, China.

Mammano, Bob, Current Sensing Solutions for Power Supply Designers, Texas Instruments, 2001, pp. 1-36, Dallas, Texas, USA.

Fairchild Semiconductor, Ballast Control IC FAN7532, Rev. 1.0.3, Jun. 2006, pp. 1-16, San Jose, California, USA.

Fairchild Semiconductor, Simple Ballast Controller, FAN7544, Rev. 1.0.0, Sep. 21, 2004, pp. 1-14, San Jose, California, USA.

Texas Instruments, High Performance Power Factor Preregulator, UC2855A/B and UC3855A/B, SLUS328B, Jun. 1998, Revised Oct. 2005, pp. 1-14, Dallas, TX, USA.

Balogh, Laszlo, et al, Power-Factor Correction with Interleaved Boost Converters in Continuous-Inductr-Current Mode, 1993, IEEE, pp. 168-174, Switzerland.

Cheng, Hung L., et al, A Novel Single-Stage High-Power-Factor Electronic Ballast with Symmetrical Topology, Power Electronics and Motion Control Conference, 2006. IPEMC 2006. CES/IEEE 5th International, Aug. 14-16, 2006, vol. 50, No. 4, Aug. 2003, pp. 759-766, Nat. Ilan Univ., Taiwan.

Fairchild Semiconductor, Theory and Application of the ML4821 Average Current Mode PFC Controllerr, Fairchild Semiconductor Application Note 42030, Rev. 1.0, Oct. 25, 2000, pp. 1-19, San Jose, California, USA.

Garcia, O., et al, High Efficiency PFC Converter to Meet EN610000302 and A14, Industrial Electronics, 2002. ISIE 2002. Proceedings of the 2002 IEEE International Symposium, vol. 3, pp. 975-980, Div. de Ingenieria Electronica, Univ. Politecnica de Madrid, Spain.

Infineon Technologies Ag, Standalone Power Factor Correction (PFC) Controller in Continuous Conduction Mode (CCM), Infineon Power Management and Supply, CCM-PFC, ICE2PCS01, ICE2PCSO1G, Version 2.1, Feb. 6, 2007, p. 1-22, Munchen, Germany.

Lu, et al, Bridgeless PFC Implementation Using One Cycle Control Technique, International Rectifier, 2005, pp. 1-6, Blacksburg, VA, USA.

Brown, et al, PFC Converter Design with IR1150 One Cycle Control IC, International Rectifier, Application Note AN-1077, pp. 1-18, El Segundo CA, USA.

International Rectifer, PFC One Cycle Control PFC IC, International Rectifier, Data Sheet No. PD60230 rev. C, IR1150(S)(PbF), IR11501(S)(PbF), Feb. 5, 2007, pp. 1-16, El Segundo, CA, USA.

International Rectifier, IRAC1150=300W Demo Board, User's Guide, Rev 3.0, International Rectifier Computing and Communications SBU—AC-DC Application Group, pp. 1-18, Aug. 2, 2005, El Segundo, CO USA.

Lai, Z., et al, A Family of Power-Factor-Correction Controller, Applied Power Electronics Conference and Exposition, 1997. APEC '97 Conference Proceedings 1997., Twelfth Annual, vol. 1, pp. 66-73, Feb. 23-27, 1997, Irvine, CA.

Lee, P, et al, Steady-State Analysis of an Interleaved Boost Converter with Coupled Inductors, IEEE Transactions on Industrial Electronics, vol. 47, No. 4, Aug. 2000, pp. 787-795, Hung Hom, Kowloon, Hong Kong.

(56) References Cited

OTHER PUBLICATIONS

Linear Technology, Single Switch PWM Controller with Auxiliary Boost Converter, Linear Technology Corporation, Data Sheet LT1950, pp. 1-20, Milpitas, CA, USA.
Linear Technology, Power Factor Controller, Linear Technology Corporation, Data Sheet LT1248, pp. 1-12, Milpitas, CA, USA.
Supertex, Inc., HV9931 Unity Power Factor LED Lamp Driver, Supertex, Inc., Application Note AN-H52, 2007, pp. 1-20, Sunnyvale, CA, USA.
Ben-Yaakov, et al, The Dynamics of a PWM Boost Converter with Resistive Input, IEEE Transactions on Industrial Electronics, vol. 46., No. 3, Jun. 1999, pp. 1-8, Negev, Beer-Sheva, Israel.
Erickson, Robert W., et al, Fundamentals of Power Electronics, Second Edition, Chapter 6, 2001, pp. 131-184, Boulder CO, USA.
Stmicroelectronics, CFL/TL Ballast Driver Preheat and Dimming L6574, Sep. 2003, pp. 1-10, Geneva, Switzerland.
Fairchild Semiconductor, 500W Power-Factor-Corrected (PFC) Converter Design with FAN4810, Application Note 6004, Rev. 1.0.1, Oct. 31, 2003, pp. 1-14, San Jose, CA, USA.
Fairfield Semiconductor, Power Factor Correction (PFC) Basics, Application Note 42047, Rev. 0.9.0, Aug. 19, 2004, pp. 1-11, San Jose, CA, USA.
Fairchild Semiconductor, Design of Power Factor Correction Circuit Using FAN7527B, Application Note AN4121, Rev. 1.0.1, May 30, 2002, pp. 1-12, San Jose, CA, USA.
Fairchild Semiconductor, Low Start-Up Current PFC/PWM Controller Combos FAN4800, Rev. 1.0.6, Nov. 2006, pp. 1-20, San Jose, CA, USA.
Prodic, Aleksander, Compensator Design and Stability Assessment for Fast Voltage Loops of Power Factor Correction Rectifiers, IEEE Transactions on Power Electronics, vol. 22, Issue 5, Sep. 2007, pp. 1719-1730, Toronto, Canada.
Fairchild Semiconductor, ZVS Average Current PFC Controller FAN 4822, Rev. 1.0.1, Aug. 10, 2001, pp. 1-10, San Jose, CA, USA.
Prodic, et al, Dead-Zone Digital Controller for Improved Dynamic Response of Power Factor Preregulators, Applied Power Electronics Conference and Exposition, 2003, vol. 1, pp. 382-388, Boulder CA, USA.
Philips Semiconductors, 90W Resonant SMPS with TEA1610 Swing Chip, Application Note AN99011, Sep. 14, 1999, pp. 1-28, The Netherlands.
Stmicroelectronics, Advanced Transition-Mode PFC Controller L6563 and L6563A, Mar. 2007, pp. 1-40, Geneva, Switzerland.
On Semiconductor, Power Factor Controller for Compact and Robust, Continuous Conduction Mode Pre-Converters, NCP1654, Mar. 2007, Rev. Po, pp. 1-10, Denver, CO, USA.
Fairchild Semicondctor, Simple Ballast Controller, KA7541, Rev. 1.0.3, Sep. 27, 2001, pp. 1-14, San Jose, CA, USA.
Fairchild Semiconductor, Power Factor Controller, ML4812, Rev. 1.0.4, May 31, 2001, pp. 1-18, San Jose, CA, USA.
Prodic, et al, Digital Controller for High-Frequency Rectifiers with Power Factor Correction Suitable for On-Chip Implementation, Power Conversion Conference—Nagoya, 2007. PCC '07, Apr. 2-5, 2007, pp. 1527-1531, Toronto, Canada.
Freescale Semiconductor, Dimmable Light Ballast with Power Factor Correction, Designer Reference Manual, DRM067, Rev. 1, Dec. 2005, M68HC08 Microcontrollers, pp. 1-72, Chandler, AZ, USA.
Freescale Semiconductor, Design of Indirect Power Factor Correction Using 56F800/E, Freescale Semiconductor Application Note, AN1965, Rev. 1, Jul. 2005, pp. 1-20, Chandler, AZ, USA.
Freescale Semiconductor, Implementing PFC Average Current Mode Control using the MC9S12E128, Application Note AN3052, Addendum to Reference Design Manual DRM064, Rev. 0, Nov. 2005, pp. 1-8, Chandler, AZ, USA.

Hirota, et al, Analysis of Single Switch Delta-Sigma Modulated Pulse Space Modulation PFC Converter Effectively Using Switching Power Device, Power Electronics Specialists Conference, 2002. pesc 02. 2002 IEEE 33rd Annual, vol. 2, pp. 682-686, Hyogo Japan.
Madigan, et al, Integrated High-Quality Rectifier-Regulators, Industrial Electronics, IEEE Transactions, vol. 46, Issue 4, pp. 749-758, Aug. 1999, Cary, NC, USA.
Renesas, Renesas Technology Releases Industry's First Critical-Conduction-Mode Power Factor Correction Control IC Implementing Interleaved Operations, R2A20112, pp. 1-4, Dec. 18, 2006, Tokyo, Japan.
Renesas, PFC Control IC R2A20111 Evaluation Board, Application Note R2A20111 Evb, all pages, Feb. 2007, Rev. 1.0, pp. 1-39, Tokyo, Japan.
Miwa, et al, High Efficiency Power Factor Correction Using Interleaving Techniques, Applied Power Electronics Conference and Exposition, 1992. APEC '92. Conference Proceedings 1992., Seventh Annual, Feb. 23-27, 1992, pp. 557-568, MIT, Cambridge, MA, USA.
Noon, Jim, High Performance Power Factor Preregulator UC3855A/B, Texas Instruments Application Report, SLUA146A, May 1996—Revised Apr. 2004, pp. 1-35, Dallas TX, USA.
NXP Semiconductors, TEA1750, GreenChip III SMPS Control IC Product Data Sheet, Rev.01, Apr. 6, 2007, pp. 1-29, Eindhoven, The Netherlands.
Turchi, Joel, Power Factor Correction Stages Operating in Critical Conduction Mode, on Semiconductor, Application Note AND8123/D, Sep. 2003—Rev. 1 , pp. 1-20, Denver, CO, USA.
On Semiconductor, GreenLine Compact Power Factor Controller: Innovative Circuit for Cost Effective Solutions, MC33260, Semiconductor Components Industries, Sep. 2005—Rev. 9, pp. 1-22, Denver, CO, USA.
On Semiconductor, Enhanced, High Voltage and Efficient Standby Mode, Power Factor Controller, NCP1605, Feb. 2007, Rev. 1, pp. 1-32, Denver, CO, USA.
On Semiconductor, Cost Effective Power Factor Controller, NCP1606, Mar. 2007, Rev. 3, pp. 1-22, Denver, CO, USA.
Renesas, Power Factor Correction Controller IC, HA16174P/FP, Rev. 1.0, Jan. 6, 2006, pp. 1-38, Tokyo, Japan.
Seidel, et al, A Practical Comparison Among High-Power-Factor Electronic Ballasts with Similar Ideas, IEEE Transactions on Industry Applications, vol. 41, No. 6, Nov./Dec. 2005, pp. 1574-1583, Santa Maria, Brazil.
Stmicroelectronics, Electronic Ballast with PFC using L6574 and L6561, Application Note AN993, May 2004, pp. 1-20, Geneva, Switzerland.
Su, et al, Ultra Fast Fixed-Frequency Hysteretic Buck Converter with Maximum Charging Current Control and Adaptive Delay Compensation for DVS Applications, IEEE Journal of Solid-State Circuits, vol. 43, No. 4, Apr. 2008, pp. 815-822, Hong Kong University of Science and Technology, Hong Kong, China.
Wong, et al, "Steady State Analysis of Hysteretic Control Buck Converters", 2008 13th International Power Electronics and Motion Control Conference (EPE-PEMC 2008), pp. 400-404, 2008, National Semiconductor Corporation, Power Management Design Center, Hong Kong, China.
Zhao, et al, Steady-State and Dynamic Analysis of a Buck Converter Using a Hysteretic PWM Control, 2004 35th Annual IEEE Power Electronics Specialists Conference, pp. 3654-3658, Department of Electrical & Electronic Engineering, Oita University, 2004, Oita, Japan.
Non-Final Office Action mailed on Nov. 29, 2012 in the parent U.S. Appl. No. 12/650,547, 6 pgs.
Response to Non-Final Office Action dated Nov. 29, 2012, as filed in the parent U.S. Appl. No. 12/650,547 on Mar. 28, 2013, 9 pgs.
Notice of Allowance mailed on May 24, 2013 in the parent U.S. Appl. No. 12/650,547, 7 pgs.

* cited by examiner

POWER CONTROL SYSTEM WITH POWER DROP OUT IMMUNITY AND UNCOMPROMISED STARTUP TIME

CROSS REFERENCE TO RELATED APPLICATIONS

This application is a continuation of co-pending application Ser. No. 12/650,547, filed Dec. 31, 2009, which is incorporated herein by reference in its entirety.

FIELD OF THE INVENTION

The present invention relates in general to the field of electronics, and more specifically to a power control system with power drop out immunity and uncompromised startup time.

DESCRIPTION OF THE RELATED ART

Switching power converters convert supplied power into a form and magnitude that is useful for numerous electronic products including cellular telephones, computing devices, personal digital assistants, televisions, other switching power converters, and lamps, such as light emitting diode and gas discharge type lamps. For example, alternating current (AC)-to-direct current (DC) switching power converters are often configured to convert AC voltages from an AC voltage source into DC voltages. Switching power converters are available in many types, such as boost-type, buck-type, boost-buck type, and Cúk type converters.

A controller controls the power conversion process of the switching power converter. Occasionally, the supplied power to the switching power converter is interrupted for a period of time, but the controller should continue functioning. Interruptions of supplied power that either completely reduce supplied power to zero or reduce supplied power to a level that prevents a load of the switching power converter from operating normally is commonly referred to as a power supply dropout (referred to herein as a "dropout"). The switching power converter is generally designed to maintain power to the controller for a period of time during a dropout. Dropout immunity can be improved by increasing the amount of time during which the controller can continue normal operation during a dropout. Controller 'startup time' is the amount of time used by the controller to begin normal operations after being OFF. Generally, conventional switching power converters are designed to trade off less dropout immunity time for faster controller startup time and vice versa. In other words, to improve dropout immunity, startup time is increased, and to improve startup time, dropout immunity is decreased.

Figure 1:
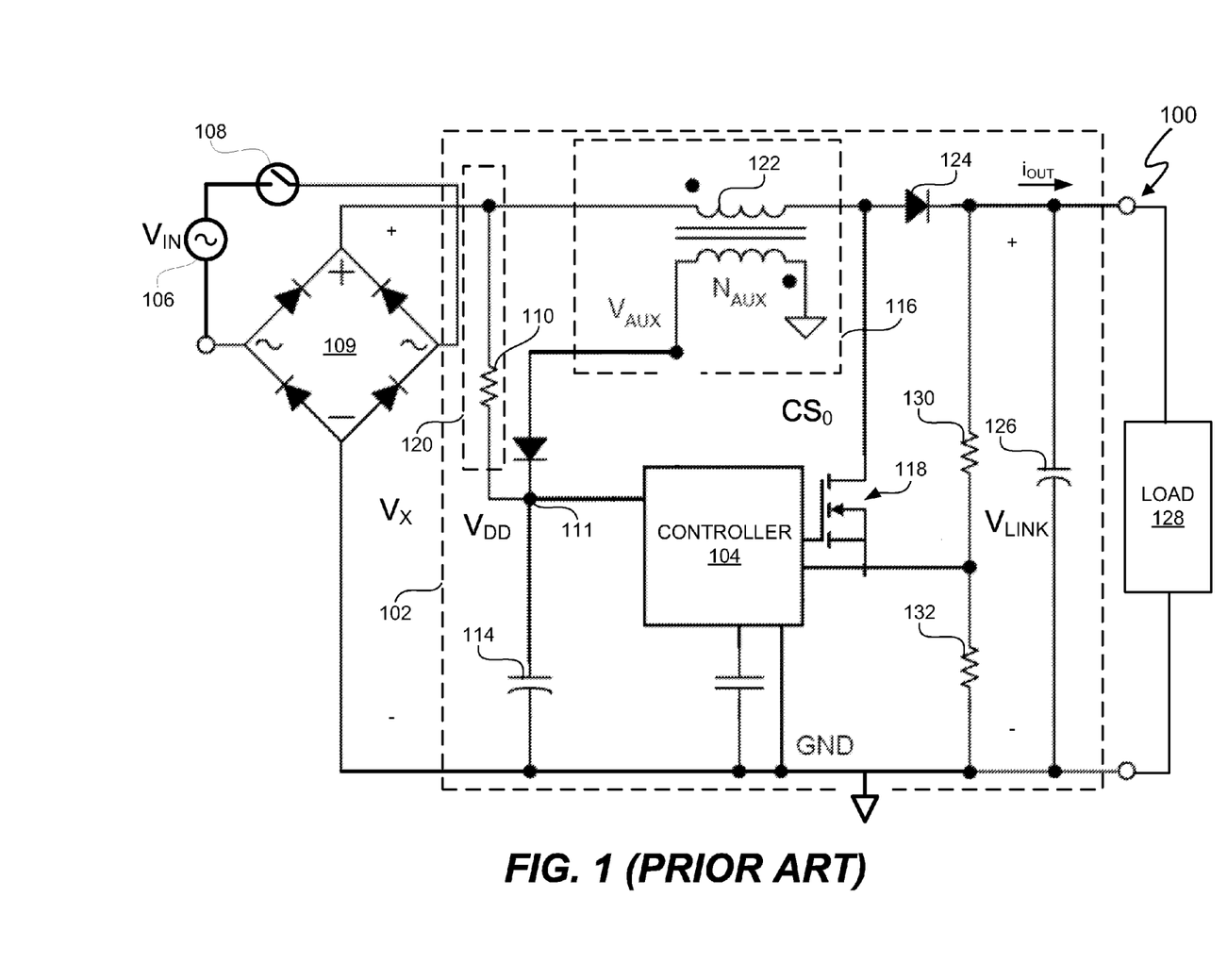
FIG. 1 (labeled prior art) depicts a power control system with a startup circuit and dropout immunity circuitry.

FIG. 1 depicts a power system 100 that includes a switching power converter 102. Power supply 106 provides an alternating current (AC) input voltage $V_{IN}$. Input voltage $V_{IN}$ is, for example, a nominally 60 Hz/110 V line voltage in the United States of America or a nominally 50 Hz/220 V line voltage in Europe. When switch 108 is ON, i.e. in a conducting state, full-bridge diode rectifier 109 rectifies the input voltage $V_{IN}$ to generate rectified input voltage $V_X$. Controller 104 controls the conversion by switching power converter 102 of rectified input voltage $V_X$ into output voltage $V_{LINK}$.

When controller 104 is OFF and switch 108 transitions from OFF, i.e. a non-conducting state, to ON, controller 104 enters a startup mode (referred to herein as "startup") as soon as source voltage $V_{DD}$ at node 111 reaches an operational level that allows the controller 104 to begin normal operation. "Normal operation" of a system means the system is operating within its design parameters. An "operational level" of supply voltage $V_{DD}$ refers to a sufficient level to allow controller 104 to maintain normal operations. During startup, power supply 106 provides startup power through resistor 110 of startup circuit 120. In order for switching power converter 102 to begin operation as soon as possible after switch 108 is ON, it is desirable to minimize the startup time of controller 104. The startup time of controller 104 depends on how quickly the voltage $V_{DD}$ rises to the operational level. The particular operational level of voltage $V_{DD}$ depends upon the design parameters of controller 104.

The amount of time taken for controller supply voltage $V_{DD}$ to rise to an operational level depends on the value of rectified input voltage $V_X$, the resistance R of resistor 110, and the capacitance C of capacitor 114. As the values of resistance R and/or capacitance C increase, the voltage $V_{DD}$ rises more slowly, thus increasing the startup time of controller 104. Conversely, as the values of resistance R and/or capacitance C decrease, the voltage $V_{DD}$ rises more quickly, thus decreasing the startup time of controller 104. Thus, the selection of the values of the resistance R and the capacitance C effectively determine the startup time for controller 104.

Once controller supply voltage $V_{DD}$ has reached an operational level, controller 104 begins normal operation to control switching power converter 102. During normal operation of switching power converter 102, auxiliary power supply 116 generates auxiliary voltage $V_{AUX}$. Auxiliary voltage supply 116 and startup circuit 120 combine to generate controller supply voltage $V_{DD}$.

The startup circuit 120 is not switched OFF during normal operation of controller 104 because capacitor 114 is also used to provide dropout immunity for switching power converter 102. If rectified input voltage $V_X$ drops to zero during normal operation of controller 104, no current flows through startup circuit 120 and auxiliary power supply 116 ceases providing power to controller 104. During a dropout of rectified input voltage $V_X$, energy stored by capacitor 114 continues to provide enough energy to maintain the supply voltage $V_{DD}$ at node 111 at a sufficient level for controller 114 to continue normal operation for a limited amount of time during a dropout. The amount of time (referred to as the "dropout immunity time") that capacitor 114 can supply operating energy to controller 104 depends upon how much energy is stored by capacitor 114. The amount of energy stored by capacitor 114 depends upon the amount of capacitance C of capacitor 114 and the time elapsed since the last time capacitor 114 was charged. The amount of capacitance C of capacitor 114 is directly proportional to the dropout immunity time. In other words, a larger capacitance C of capacitor 114 stores more energy and, thus, increases the dropout immunity time. Conversely, a smaller capacitance C of capacitor 114 stores less energy and, thus, decreases the dropout immunity time.

During normal operation, controller 104 generates a pulse width modulated control signal $CS_0$ that controls a gate-to-source voltage of field effect transistor (FET) 118 and, thus, controls conductivity of FET 118. When FET 118 is ON, inductor 122 begins storing energy. Diode 124 prevents discharge of link capacitor 126 through FET 118. When control signal $CS_0$ turns FET 118 OFF, an inductor flyback period begins as rectified input voltage $V_X$ and the energy stored by inductor 126 boosts the voltage of link capacitor 126. Thus, switching power converter 102 is commonly referred to as a 'boost-type' switching power converter. The capacitance of link capacitor 126 is selected to maintain an approximately constant link voltage $V_{LINK}$ for load 128. Load 128 can be any type of load, such as a cellular telephone, computing device, personal digital assistant, televisions, another switching power converter, or a lamp, such as light emitting diode and gas discharge type lamps. The pulse width of control signal $CS_0$ can be adjusted to maintain a desired output current $i_{OUT}$ of switching power converter 102. The output current $i_{OUT}$ is sensed by controller 104 through the resistor divider network of resistors 130 and 132. Prodić, *Compensator Design and Stability Assessment for Fast Voltage Loops of Power Factor Correction Rectifiers*, IEEE Transactions on Power Electronics, Vol. 22, No. 5, September 2007, pp. 1719-1729 (referred to herein as "Prodić"), describes an example of controller 104.

Capacitor 114 is charged for both startup and dropout immunity for controller 104. However, although increasing the capacitance C of capacitor 114 improves dropout immunity, the startup time of controller 104 worsens. Conversely, decreasing the capacitance C of capacitor 114 worsens dropout immunity but improves the startup of controller 104. Consequently, selecting a value for capacitance C of capacitor 114 is a tradeoff between startup time and dropout immunity for controller 114. Thus, it is difficult to optimize both startup time and dropout immunity. Additionally, resistor 110 of startup circuit 120 continues to cause power losses even after startup of controller 104.

SUMMARY OF THE INVENTION

In one embodiment of the present invention, an apparatus includes a startup capacitor configured to couple to a controller and a dropout immunity capacitor configured to couple between a first voltage source and the controller. A capacitance of the dropout immunity capacitor is greater than a capacitance of the startup capacitor. The startup capacitor is configured to provide sufficient energy to the controller to allow the controller to begin normal operation. The dropout immunity capacitor is configured to provide sufficient energy to the controller for a period of time when the first voltage source provides insufficient power to allow the controller to continue normal operation.

In another embodiment of the present invention, a power control system includes a switching power converter and a controller coupled to the switching power converter, wherein the controller is configured to generate a switch control signal to control the switching power converter. The power control system also includes a startup capacitor coupled to the controller and a dropout immunity capacitor coupled to the controller and configured to couple to a first voltage source. A capacitance of the dropout immunity capacitor is greater than a capacitance of the startup capacitor. The startup capacitor is configured to provide sufficient energy to the controller to allow the controller to begin normal operation. The dropout immunity capacitor is configured to provide sufficient energy to the circuit for a period of time when the first voltage source provides insufficient power to allow the controller to continue normal operation.

In a further embodiment of the present invention, a method includes providing sufficient energy to a controller from a startup capacitor to allow the controller to begin normal operation. The method also includes providing sufficient energy to the controller from a dropout immunity capacitor for a period of time when a first voltage source provides insufficient power to allow the controller to continue normal operation. A capacitance of the dropout immunity capacitor is greater than a capacitance of the startup capacitor.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In at least one embodiment, a power control system provides immunity from power supply dropout for a controller without compromising a startup time of the controller. In at least one embodiment, the power control system includes separate startup and dropout immunity capacitors. In at least one embodiment, selection of the capacitance of the startup capacitor is independent of selection of the capacitance of the dropout immunity capacitance. In at least one embodiment, the startup capacitance can be minimized to provide reduced startup time for the controller and provide sufficient energy for the controller to normally operate for up to approximately one missed cycle of an input voltage. In at least one embodiment, the capacitance of the dropout immunity capacitor can be maximized to provide sufficient energy for the controller to operate normally for longer than one missed cycle of the input voltage. In at least one embodiment, the startup capacitor and dropout immunity capacitors are part of respective startup and dropout immunity circuits. The particular implementation of the startup circuit and the dropout immunity circuit is a matter of design choice. In at least one embodiment, the startup and dropout immunity circuits are implemented using discrete circuits. In at least one embodiment, at least part of the dropout immunity circuit is integrated as part of the controller. For example, in at least one embodiment, control circuitry for the dropout immunity circuit is integrated as part of an integrated circuit implementation of the controller.

Figure 2:
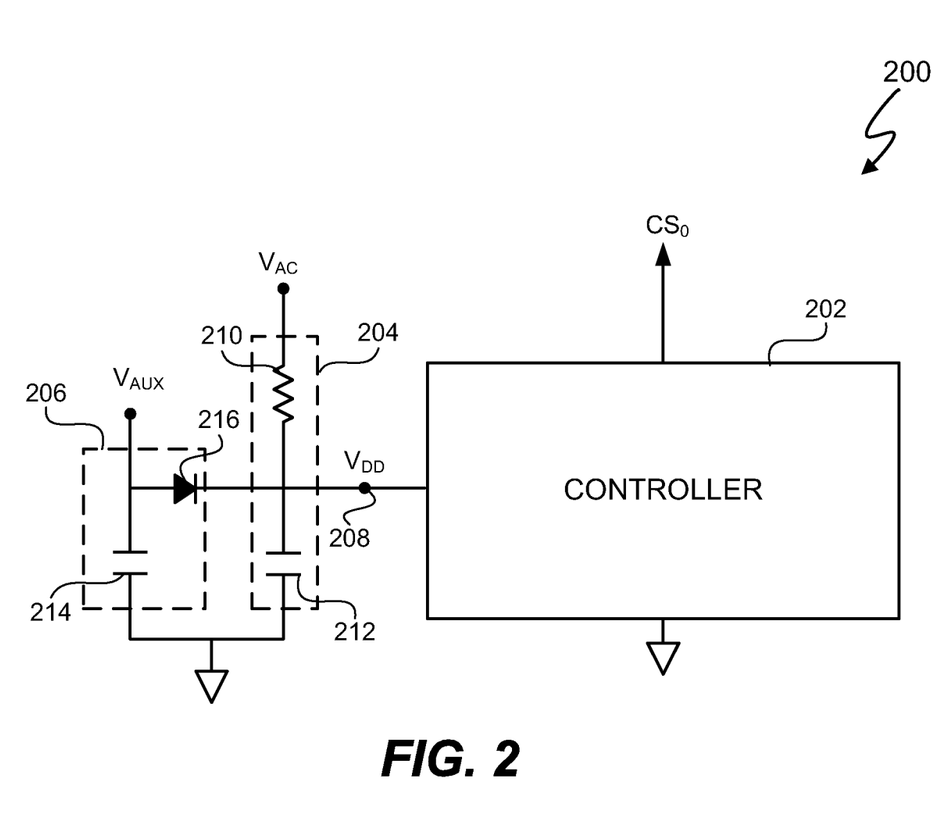
FIG. 2 depicts one embodiment of a power/controller system that includes a controller, startup circuit, and dropout immunity circuit.

FIG. 2 depicts one embodiment of a power/controller system 200 that includes a controller 202, startup circuit 204, and dropout immunity circuit 206. The startup circuit 204 and dropout immunity circuit 206 of power/controller system 200 are implemented externally to the controller 202.

Controller 202 can be any type of controller. In at least one embodiment, controller 202 generates a control signal $CS_O$ to control any type of switching power converter including the boost-type switching power converter 602 of FIG. 6, a buck-type converter, a boost-buck type converter, and a Cúk converter. Supply voltage $V_{AC}$ provides an alternating current (AC) voltage to startup circuit 204. The supply voltage $V_{AC}$ can be any voltage. In at least one embodiment, supply voltage $V_{AC}$ is identical to the rectified input voltage $V_X$ of FIG. 6. The auxiliary voltage $V_{AUX}$ provides voltage to the dropout immunity circuit 206. The auxiliary voltage $V_{AUX}$ can be any voltage. In at least one embodiment, the auxiliary voltage $V_{AUX}$ is generated by an auxiliary power supply such as auxiliary power supply 624 of FIG. 6.

Controller 202 operates from a supply voltage $V_{DD}$ at node 208, and the startup circuit 204 and dropout immunity circuit 206 maintain supply voltage $V_{DD}$ at an operational level that allows controller 202 to normally operate. "Normal operation" of a system means the system is operating within its design parameters. An "operational level" of supply voltage $V_{DD}$ refers to a sufficient level to allow a controller, such as controller 202, to maintain normal operations. The startup circuit 204 receives energy from the supply voltage $V_{AC}$. When the supply voltage $V_{AC}$ is initially supplied to the startup circuit 204, current flows through resistor 210 and charges capacitor 212. As discussed in more detail with reference to FIG. 5, in at least one embodiment, the capacitance $C_{SU}$ of startup capacitor 212 is set so that the startup capacitor 212 can maintain the supply voltage $V_{DD}$ during a dropout of supply voltage $V_{AC}$ so that controller 202 can normally operate up to a time equivalent to one cycle of supply voltage $V_{AC}$. For example, if supply voltage $V_{AC}$ has a frequency of 60 Hz, in one embodiment, startup capacitor 212 can supply sufficient energy to controller 202 to allow controller 202 to normally operate for 1/60 secs. The amount of time (referred to as "holdup time") for which startup capacitor 212 can maintain supply voltage $V_{DD}$ at an operational level is a matter of design choice. The amount of holdup time for startup capacitor 212 is directly proportional to the capacitance value $C_{su}$ and inversely proportional to the amount of time for supply voltage $V_{DD}$ to rise to an operational level.

The supply voltage $V_{AC}$ can dropout for any number of reasons. For example, when controller 202 controls a switching power converter driving a lighting system, a circuit (such as circuit 604 in FIG. 6) can temporarily cause supply voltage $V_{AC}$ to drop out for less than one cycle (i.e. period) of supply voltage $V_{AC}$. For example, in a lighting system context, a dimming circuit, such as a triac dimmer, phase modulates the supply voltage $V_{AC}$ (i.e. the supply voltage $V_{AC}$ drops to approximately zero for a phase of the supply voltage $V_{AC}$ corresponding to a dimming level.) During phase modulation, startup capacitor 212 maintains supply voltage $V_{DD}$ at node 208 at an operational level for up to one missing cycle of supply voltage $V_{AC}$. (For more information about triac dimmers see U.S. patent application Ser. No. 12/047,249, entitled "Ballast for Light Emitting Diode Light Sources", inventor John L. Melanson, filed on Mar. 12, 2008 and commonly assigned to Cirrus Logic, Inc.).

Charging of dropout immunity capacitor 214 is a passive operation in that auxiliary voltage $V_{AUX}$ begins charging dropout immunity capacitor 214 as soon as auxiliary voltage $V_{AUX}$ exceeds a voltage threshold (typically 0.7 V for a silicon diode) of diode 216. The dropout immunity circuit 206 receives energy from the auxiliary voltage $V_{AUX}$. In at least one embodiment, the auxiliary voltage $V_{AUX}$ is generated from a primary supply voltage source, such as the source of supply voltage $V_{AC}$. Thus, when the primary supply voltage source drops out, the auxiliary voltage $V_{AUX}$ typically also drops out. As discussed in more detail with reference to FIG. 5, in at least one embodiment, the capacitance $C_{DO}$ of dropout immunity capacitor 214 is set so that the dropout capacitor 214 can supply sufficient energy to allow controller 202 to normally operate during a time period that exceeds one cycle of the supply voltage $V_{AC}$.

For example, when controller 202 controls a switching power converter driving a lighting system, a circuit (such as switch 604 in FIG. 6) can temporarily cause supply voltage $V_{AC}$ to drop out for multiple cycles of supply voltage $V_{AC}$ and then reconnect supply voltage $V_{AC}$. For example, in at least one embodiment, the controller 202 supports a 'dimming on random switching' ("DORS") dimming operation. As subsequently explained in more detail with reference to FIG. 5, the DORS dimming operation allows a person or device to randomly disconnect and then reconnect the supply voltage $V_{AC}$ within a limited period of time, such as 1 second or less. The controller 202 interprets the dropout and reconnection of supply voltage $V_{AC}$ as a dimming command.

To maintain normal operation of controller 202 during a DORS related dropout of supply voltage $V_{AC}$, dropout immunity capacitor 214 maintains supply voltage $V_{DD}$ at node 208 at a sufficient level to allow controller 202 to maintain normal operations and process the voltage dropout as DORS dimming information. For a 50 Hz supply voltage $V_{AC}$, the DORS related dropout of up to 1 second equates to up to 50 cycles of supply voltage $V_{AC}$. Thus, the capacitance $C_{DO}$ of dropout immunity capacitor 214 is larger than the capacitance $C_{SU}$ of startup capacitor 212 to allow the dropout immunity circuit 214 to maintain energy for normal operation of controller 202 for an extended period of time. However, in at least one embodiment, the lower value of capacitance $C_{SU}$ of startup capacitor 212 relative to capacitance $C_{DO}$ allows node 208 to charge to a sufficient voltage level to allow controller 202 to begin normal operations in a shorter amount of time than occurs with the conventional power system 100 (FIG. 1) without compromising dropout immunity time and vice versa. The particular capacitance $C_{DO}$ of dropout immunity capacitor 214 is a matter of design choice. The value of capacitance $C_{DO}$ is directly proportional to the holdup time of supply voltage $V_{DD}$ during a dropout of auxiliary voltage $V_{AUX}$. In at least one embodiment, the capacitance $C_{DO}$ is 10 µF.

The dropout immunity circuit 206 also includes diode 216. Diode 216 prevents the startup capacitor 212 from discharging to dropout capacitor 214 when the auxiliary voltage $V_{AUX}$ drops out. Thus, during a one cycle or less dropout of supply voltage $V_{AC}$ and auxiliary voltage $V_{AUX}$, the energy stored by startup capacitor 212 is used to maintain the supply voltage $V_{DD}$ at an operational level.

Figure 3:
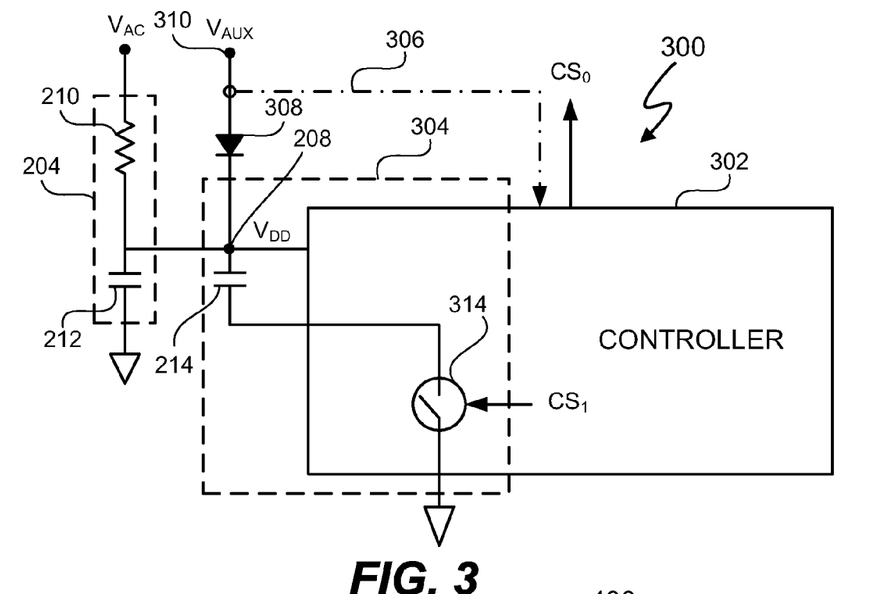
FIG. 3 depicts one embodiment of a power/controller system that includes a controller, startup circuit, and dropout immunity circuit that is partially included in the controller and controlled by the controller.

FIG. 3 depicts one embodiment of a power/controller system 300 that includes a controller 302, startup circuit 204, and dropout immunity circuit 304. In at least one embodiment, the dropout immunity circuit 304 is implemented partially external to the controller 302 and is partially integrated as part of controller 302. The startup circuit 204 functions as previously described with reference to FIG. 2.

Controller 302 determines when dropout immunity capacitor 214 charges so as to allow startup capacitor 212 to quickly charge supply voltage $V_{DD}$ at node 208 to an operational level without also charging the relatively slow charging of dropout immunity capacitor 214. During startup of controller 302, supply voltage $V_{AC}$ charges startup capacitor 212 until supply voltage $V_{DD}$ at node 208 reaches an operational level. Controller 302 begins normal operation, which can include a predetermined startup routine, when the supply voltage $V_{AC}$ charges startup capacitor 212 sufficiently so that supply voltage $V_{DD}$ at node 208 reaches an operational level.

In at least one embodiment, controller 302 monitors auxiliary voltage $V_{AUX}$ at node 208 via a sense path 306. Sense path 306 is depicted as a segmented line, because sense path 306 is optional. In at least one embodiment, at the startup of controller 302, the auxiliary voltage $V_{AUX}$ generated by an auxiliary power supply (such as auxiliary power supply 624 FIG. 6) is insufficient to raise supply voltage $V_{DD}$ to an operational level. Controller 302 generates control signal $CS_1$ to turn switch 314 OFF, i.e. nonconductive. Switch 314 can be any type of switch. In at least one embodiment, switch 314 is an n-channel field effect transistor ("FET"), and control signal $CS_1$ is a gate-to-source voltage signal. When switch 314 is OFF, dropout immunity capacitor 214 does not charge. Diode 308 prevents current flow into node 310. Thus, during startup of controller 302, since no current flows from node 208 to node 310 and dropout immunity capacitor 214 does not charge, energy supplied by supply voltage $V_{AC}$ is not used to also charge dropout immunity capacitor 214. Thus, the supply voltage $V_{DD}$ rises to an operational level faster than would occur if supply voltage $V_{AC}$ charged both the startup capacitor 212 and the dropout immunity capacitor 214 at the startup of controller 302.

In at least one embodiment, sense path 306 is not present and controller 302 assumes that auxiliary voltage $V_{AUX}$ is at a level sufficient to charge dropout immunity capacitor 214 and thereby holds supply voltage $V_{DD}$ at an operational level once controller 302 begins normal operation. Once controller 302 determines or assumes that the auxiliary voltage $V_{AUX}$ has risen to a level sufficient to charge dropout immunity capacitor 214 to at least supply voltage $V_{DD}$, controller 302 generates control signal $CS_1$ to turn switch 314 ON, i.e. conductive. When switch 314 is ON, dropout immunity capacitor 214 begins storing energy to provide immunity from a dropout of auxiliary voltage $V_{AUX}$ as previously described with reference to power/controller system 200 (FIG. 2).

Figure 4:
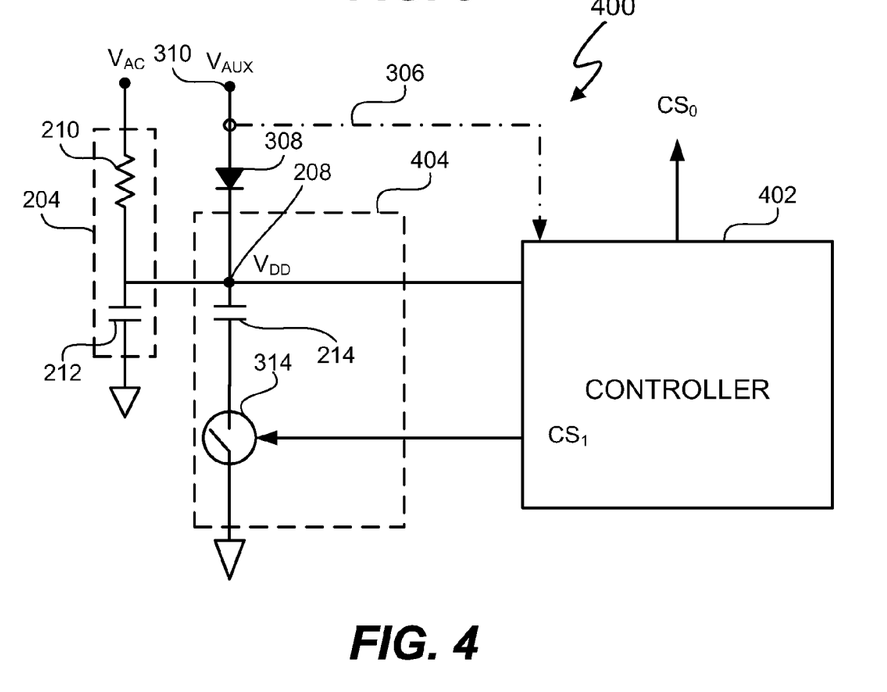
FIG. 4 depicts one embodiment of a power/controller system that includes a controller, startup circuit, and dropout immunity circuit that is external to the controller and controlled by the controller.

FIG. 4 depicts one embodiment of a power/controller system 400 that includes a controller 402, startup circuit 204, and dropout immunity circuit 404. In at least one embodiment, the controller 402 is identical in operation to controller 302 (FIG. 3), and dropout immunity circuit 404 is identical in operation to dropout immunity circuit 304 except that dropout immunity circuit 404 is implemented wholly external to controller 402. In at least one embodiment, the dropout immunity circuit 404 is implemented using discrete components, and controller 402 is implemented as an integrated circuit.

Figure 5:
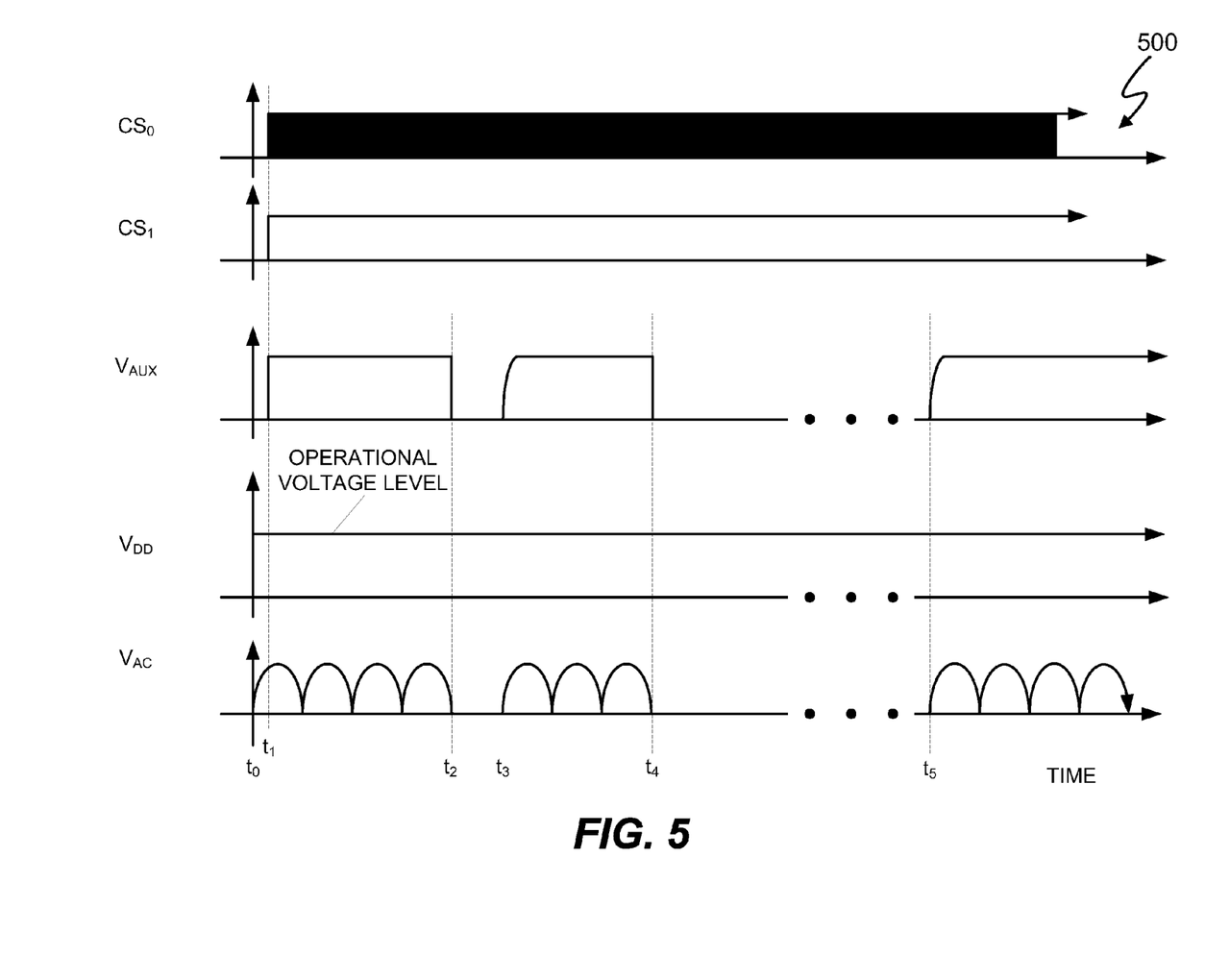
FIG. 5 depicts a plurality of signals including of exemplary representations of an auxiliary voltage, a controller supply voltage, an alternating current supply voltage, and controller generated control signals.

FIG. 5 depicts a plurality of signals 500 consisting of exemplary representations of auxiliary voltage $V_{AUX}$, a controller supply voltage $V_{DD}$, supply voltage $V_{AC}$, control signal $CS_0$, and switch control signal $CS_1$. As described in more detail, FIG. 5 depicts a scenario in time beginning at startup of controllers 202, 302, or 402 at time $t_0$ and dropout of supply voltage $V_{AC}$ and auxiliary voltage $V_{AUX}$ for various periods of time. The voltage levels of auxiliary voltage $V_{AUX}$, supply voltage $V_{AC}$, and supply voltage $V_{DD}$ are for illustration purposes and, in at least one embodiment, are not drawn to scale.

Referring to FIGS. 2, 3, 4, and 5, at time $t_0$ auxiliary voltage $V_{AUX}$ is an approximately constant direct current (DC) voltage and supply voltage $V_{AC}$ provides a rectified AC voltage. Supply voltage $V_{DD}$ remains approximately constant at an operational level for controller 202, controller 302, or controller 402. At time $t_0$, switch control signal $CS_1$ causes switch 314 to stay OFF. In at least one embodiment, switch control signal is a logical 0, which is insufficient to turn ON switch 314. Supply voltage $V_{AC}$ begins charging startup capacitor 212 at time $t_0$. In at least one embodiment, the capacitance $C_{SU}$ of startup capacitor 212 and resistance of resistor 210 allow supply voltage $V_{DD}$ to reach an operational level of 12V within 25 msec. In at least one embodiment, capacitance $C_{SU}$ is approximately 1 µf. By isolating dropout immunity capacitor 214 from startup capacitor 212 via diode 216 (FIG. 2) and switch 314 (FIG. 3), the supply voltage $V_{AC}$ can initially charge startup capacitor 212 without additionally charging dropout immunity capacitor 214. Thus, the startup time of controllers 202 and 302 are improved while still providing dropout immunity using dropout immunity capacitor 214.

When supply voltage $V_{DD}$ reaches an operational level, controller 202, controller 302, or controller 402 begins operating normally. During normal operation, controller 202, controller 302, or controller 402 begins generating control signal $CS_0$. In the embodiment of FIG. 5, once controller 202, controller 302, or controller 402 begins generating control signal $CS_0$, an auxiliary power supply (such as auxiliary power supply 624 of FIG. 6) begins generating auxiliary voltage $V_{AUX}$. Once controller 302 or controller 402 determines that the auxiliary voltage $V_{AUX}$ is available to charge the dropout immunity capacitor 214, controller 302 or controller 402 generates control signal $CS_1$ to turn switch 314 ON. In at least one embodiment, control signal $CS_0$ is duty cycle modulated. The solid black representation of control signal $CS_0$ represents exemplary state changes of control signal $CS_0$ at a high frequency relative to the frequency of supply voltage $V_{AC}$. At time $t_1$, startup capacitor 212 is charged to an operational level of supply voltage $V_{DD}$. Between time $t_1$ and $t_2$, dropout immunity capacitor 214 is also charged to the operational level of supply voltage $V_{DD}$. Control signal $CS_1$ remains at a logical 1 to keep switch 314 ON until controller 302 or controller 402 turns OFF. As subsequently described, after time $t_1$, startup capacitor 212 and/or dropout immunity capacitor 214 are able to maintain supply voltage $V_{DD}$ at an approximately constant DC operational level while controller 202, controller 302, or controller 402 is ON.

At time $t_2$, the auxiliary voltage $V_{AUX}$ and the supply voltage $V_{AC}$ dropout. In at least one embodiment, the auxiliary voltage $V_{AUX}$ drops out when the supply voltage $V_{AC}$ drops out, and the supply voltage $V_{AC}$ can drop out for up to one cycle due to, for example, phase modulation of supply voltage $V_{AC}$ or unintended power perturbations. The supply voltage $V_{AC}$ is reinstated at time $t_3$ and, thus, only drops out for one cycle. Between times $t_2$ and $t_3$, which represents one cycle of supply voltage $V_{AC}$, startup capacitor 212 holds the supply voltage $V_{DD}$ at an approximately constant, operational level to allow controller 202, controller 302, or controller 402 to normally operate.

Between times $t_3$ and $t_4$, supply voltage $V_{AC}$ charges startup capacitor 212 and maintains supply voltage $V_{DD}$ at an operational level. The auxiliary voltage $V_{AUX}$ also rises when supply voltage $V_{AC}$ is reinstated. Between times $t_4$ and $t_5$, the auxiliary voltage $V_{AUX}$ and the supply voltage $V_{AC}$ both drop out. In at least one embodiment, the supply voltage $V_{AC}$ drops out due to DORS dimming Between times $t_4$ and $t_5$, dropout immunity capacitor 214 supplies sufficient energy to maintain supply voltage $V_{DD}$ at the operational level. In at least one embodiment, the difference between times $t_4$ and $t_5$ is less than or equal to one (1) second, and the capacitance $C_{DO}$ of dropout immunity capacitor 214 is sufficient to supply enough energy to node 208 to maintain supply voltage $V_{DD}$ at the operational level. By maintaining supply voltage $V_{DD}$ at the operational level, controllers 202 and 302 maintain operation and are able to implement the DORS dimming operation without using nonvolatile memory to store a previous dimming value and without incurring a startup cycle between DORS dimming signals. If the time difference between times $t_4$ and $t_5$ exceeds the 'hold-up' time of dropout immunity capacitor 214, controller 202, controller 302, or controller 402 powers down. At time $t_5$, supply voltage $V_{AC}$ is reinstated, auxiliary voltage $V_{AUX}$ rises, and supply voltage $V_{DD}$ remains at the operational level.

Figure 6:
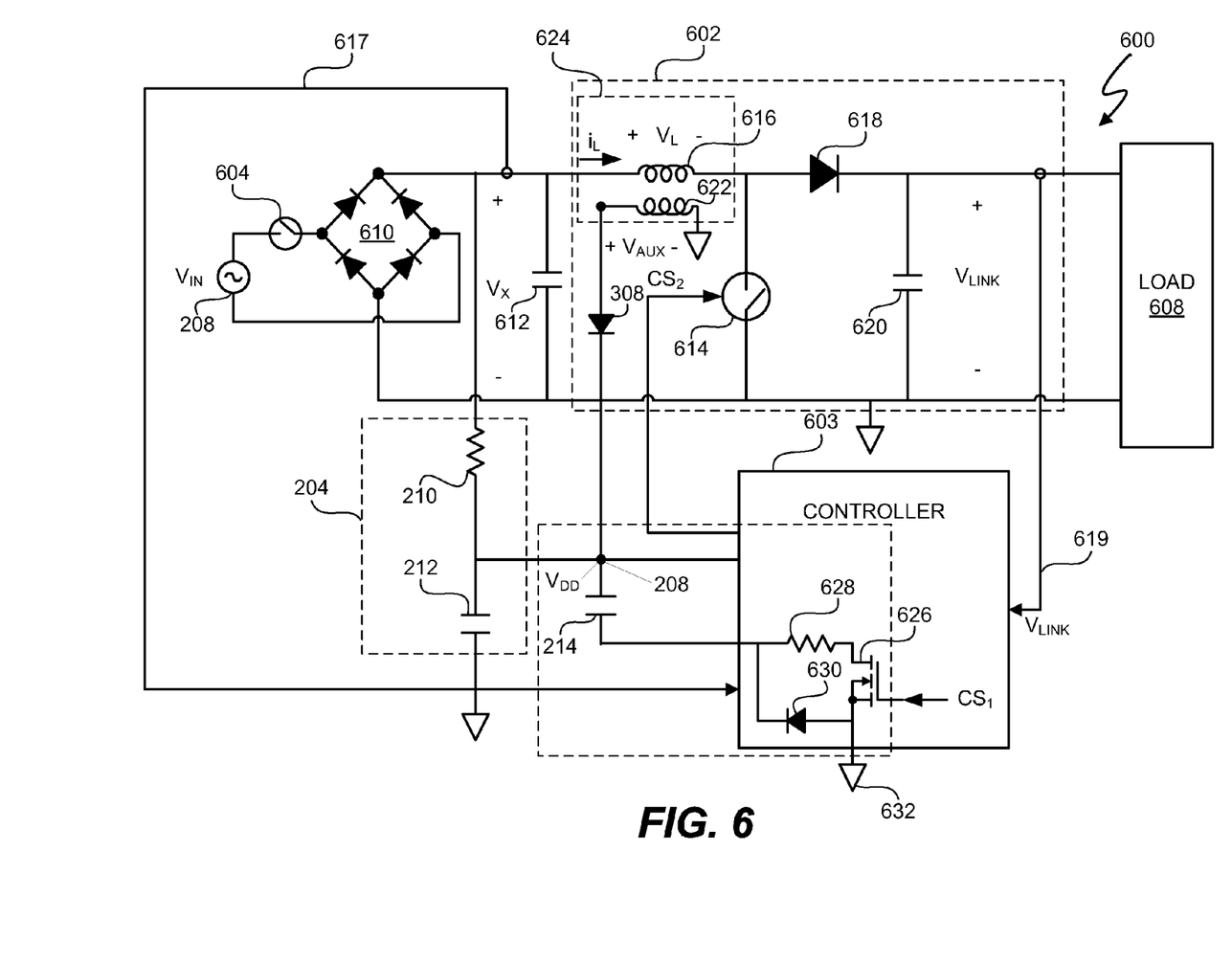
FIG. 6 depicts a power/controller system that represents one embodiment of the power/controller system of FIG. 3.

FIG. 6 depicts a power control system 600 that includes a boost-type switching power converter 602 controlled by controller 603. The switching power converter 602 provides a link voltage to load 608. Load 608 can be any type of load, such as another switching power converter or a lighting system that includes one or more lamps. The lamps can be any type of lamps including gas discharge type lamps (such as fluorescent lamps) or light emitting diodes (LEDs).

Figure 7:
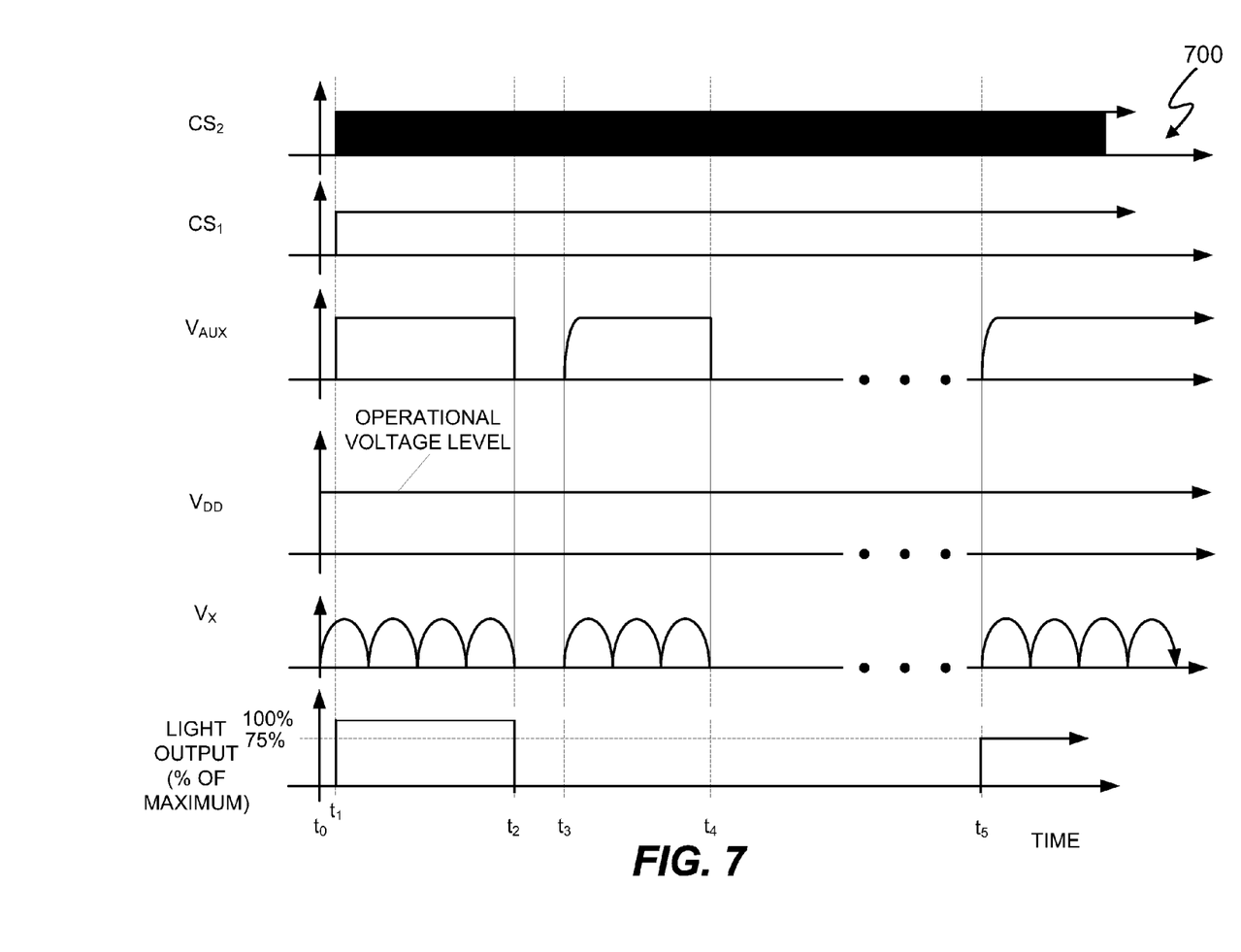
FIG. 7 depicts a plurality of signals associated with the power/controller system of FIG. 6.

FIG. 7 depicts a plurality of signals 700, including auxiliary voltage $V_{AUX}$, supply voltage $V_{DD}$, supply voltage $V_{AC}$, switch control signal $CS_1$, and switch control signal $CS_2$. In at least one embodiment, load 608 is a lighting system, and the Lighting Output signal represents a percentage of maximum lighting output from load 608 corresponding to various events described subsequently.

Referring to FIGS. 6 and 7, at time $t_0$, supply voltage $V_{IN}$ is rectified by full-bridge diode rectifier 610 to generate a rectified input voltage $V_X$. Capacitor 612 provides high frequency filtering. Controller 603 generates a duty cycle modulated, switch control signal $CS_2$ to provide power factor correction and regulation of link voltage $V_{LINK}$. In at least one embodiment, switch control signal $CS_2$ is identical to control signal $CS_0$. Switch control $CS_2$ changes state at a frequency much higher (e.g. greater than or equal to 25 kHz) than the frequency of rectified input voltage $V_X$ (e.g. 100-120 Hz), and is, thus, represented in solid black.

In at least one embodiment, switch control signal $CS_0$ controls conductivity of switch 614. In at least one embodiment, switch 614 is an n-channel FET. When switch 614 conducts, inductor 616 stores energy from inductor current $i_L$ in a magnetic field. Diode 618 prevents link capacitor 620 from discharging into inductor 616. When switch 614 is non-conductive, the switching power converter 602 begins an inductor flyback mode, and the voltage of rectified input voltage $V_X$ and an inductor voltage $V_L$ combine to boost the link voltage $V_{LINK}$ above the rectified input voltage $V_X$. In at least one embodiment, controller 603 operates switching power converter 602 in continuous conduction mode. In at least one embodiment, controller 603 operates switching power converter in discontinuous conduction mode. In at least one embodiment, controller 603 monitors the rectified input voltage $V_X$ via feed forward path 617 to provide power factor correction for switching power converter 602. In at least one embodiment, controller 603 also monitors the link voltage $V_{LINK}$ via feedback path 619. In at least one embodiment, controller 603 generates switch control signal $CS_2$ to operate switch 614 and thereby provide power factor correction and regulation of link voltage $V_{LINK}$ as illustratively described in U.S. patent application Ser. No. 11/967,269, entitled "Power Control System Using a Nonlinear Delta-Sigma Modulator with Nonlinear Power Conversion Process Modeling," inventor John L. Melanson, and filed on Dec. 31, 2007.

Inductor 622 is magnetically coupled to inductor 616 to form an auxiliary power supply 624. In at least one embodiment, inductors 616 and 622 are implemented as respective primary-side and secondary-side coils of a transformer that can include a magnetic core (not shown). The auxiliary voltage $V_{AUX}$ is the voltage across inductor 622. Thus, when rectified input voltage $V_X$ is non-zero, auxiliary power supply 624 generates the auxiliary voltage $V_{AUX}$. However, when rectified input voltage $V_X$ drops out, the auxiliary voltage $V_{AUX}$ also drops out.

At time $t_0$, with reference to FIGS. 6 and 7, the rectified input voltage $V_X$ charges startup capacitor 212 through resistor 210 of startup circuit 204. The voltage across startup capacitor 212 is the supply voltage $V_{DD}$. At time $t_1$, the startup capacitor 212 is charged to an operational level of supply voltage $V_{DD}$, and controller 603 begins normal operation. In normal operation, controller 603 begins generating the duty cycle modulated, switch control signal $CS_2$ to operate switch 614. In at least one embodiment, switch 614 is an n-channel FET. Once switching power converter 602 begins normal operation at time $t_1$, auxiliary power supply 624 generates auxiliary voltage $V_{AUX}$, and controller 603 changes a state of control signal $CS_1$ from logical 0 to logical 1 to turn FET 626 ON. Once FET 626 is ON, dropout immunity capacitor 214 charges to approximately supply voltage $V_{DD}$. In the embodiment of FIG. 7, dropout immunity capacitor 214 charges to approximately supply voltage $V_{DD}$ between times $t_1$ and $t_2$. The charging time of dropout capacitor 214 depends on auxiliary power supply 624, the capacitance $C_{DO}$ of dropout immunity capacitor 214, and the resistance of resistor 628. The particular values of $C_{DO}$, $C_{SU}$, and the resistance of resistor 628 are a matter of design choice. In at least one embodiment, capacitance $C_{SU}$ is sufficient to maintain an operational level of supply voltage $V_{DD}$ up to one cycle of rectified input voltage $V_X$ when the rectified input voltage $V_X$ drops out. In at least one embodiment, the capacitance of $C_{DO}$ is sufficient to allow controller 603 to continue normal operation when rectified input voltage $V_X$ drops out in accordance with a DORS dimming operation. In at least one embodiment, the capacitance $C_{DO}$ is 10 times $C_{SU}$. For example, in at least one embodiment, capacitance $C_{DO}$ equals 10 µF, and capacitance $C_{SU}$ equals 1 µF.

In at least one embodiment, auxiliary voltage $V_{AUX}$ is nominally 13V. FET 626 represents one embodiment of switch 314 (FIG. 3). Resistor 628 provides a resistive path for charging dropout immunity capacitor 214. Thus, at time $t_0$, both startup capacitor 212 and dropout immunity capacitor 214 are charged to approximately supply voltage $V_{DD}$. Also at time $t_1$, in the embodiment of FIG. 7, the light output of load 608 is at 100% of maximum light output for load 608. In at least one embodiment, the resistance of resistor 628 is greater than 5 kohms. Diode 630 provides a low resistance reverse path from reference node 632 to capacitor 214.

At time $t_2$, the rectified input voltage $V_X$ and, consequently, the auxiliary voltage $V_{AUX}$, drop out until time $t_3$. Diode 308 prevents current flow from startup capacitor 212 and dropout immunity capacitor 214 into auxiliary power supply 624. The startup capacitor 212 and dropout immunity capacitor 214 provide energy to maintain supply voltage $V_{DD}$ at an operational level. Thus, controller 603 continues to operate normally during the dropout of rectified input voltage $V_X$ and auxiliary voltage $V_{AUX}$.

At time $t_3$, rectified input voltage $V_X$ is reinstated and, thus, the auxiliary power supply 624 generates a positive auxiliary voltage $V_{AUX}$.

At time $t_4$, the rectified input voltage $V_X$ drops out. In at least one embodiment, the dropout of rectified input voltage $V_X$ results from switch 604 turning OFF in order to change the light output level of load 608 from 100% to 75%.

At time $t_5$, switch 604 is turned back ON, which reinstates rectified input voltage $V_X$. The difference between times $t_4$ and $t_5$ is within the maximum allowable dropout time of rectified input voltage $V_X$ for a DORS dimming indication. Accordingly, dropout immunity capacitor 214 maintains supply voltage $V_{DD}$ at an operational level, which allows controller 603 to continue operation. Controller 603 detects the reinstatement of rectified input voltage $V_X$ via feed forward path 617 and generates control signal $CS_2$ so that the light output of load 608 drops to 75% of the maximum light output of load 608.

The process described in conjunction with FIGS. 6 and 7 is illustrative and can be repeated or rearranged any number of times.

Thus, in at least one embodiment, separate startup circuit and a dropout immunity circuit facilitates implementing a startup circuit without tradeoff and compromise of dropout immunity.

Although embodiments have been described in detail, it should be understood that various changes, substitutions, and alterations can be made hereto without departing from the spirit and scope of the invention as defined by the appended claims.

What is claimed is:

1. A lighting system comprising:
   one or more light emitting diodes;
   a switching power converter coupled to the one or more light emitting diodes;
   a controller, coupled to the switching power converter, configured to generate one or more control signals to control the switching power converter and light output from the one or more light emitting diodes;
   a startup capacitor coupled to the controller;
   a dropout immunity capacitor coupled between a first voltage source and the controller, wherein a capacitance of the dropout immunity capacitor is greater than a capacitance of the startup capacitor;
   wherein the startup capacitor is configured to provide sufficient energy to the controller to allow the controller to begin normal operation prior to the dropout immunity capacitor having sufficient energy to provide to the controller to allow the controller to operate normally;
   wherein the dropout immunity capacitor is configured to provide sufficient energy to the controller for a period of time when the first voltage source provides insufficient power to allow the controller to continue normal operation.

2. The lighting system of claim 1, wherein the controller comprises a switch coupled to the dropout immunity capacitor, and the controller is configured to actively control charging of the dropout immunity capacitor.

3. The lighting system of claim 2 further comprising:
   a switch coupled to the dropout immunity capacitor and the controller, wherein the controller is configured to control the switch to control charging of the dropout immunity capacitor.

4. The lighting system of claim 3 wherein the switch is external to the controller.

5. The lighting system of claim 3 wherein the switch is internal to the controller.

6. The lighting system of claim 1 wherein the controller is configured to prevent the dropout immunity capacitor from charging until the startup capacitor is able to provide sufficient energy to the controller to allow the controller to begin normal operation.

7. The lighting system of claim 2 wherein the switch is coupled in series with the dropout immunity capacitor and connected to a reference voltage node.

8. The lighting system of claim 1 wherein the capacitance of the dropout immunity capacitor is approximately 10 times greater than the capacitance of the startup capacitor.

9. The lighting system of claim 1 wherein the startup capacitor is further configured to couple to a second voltage source and the second voltage source generates an alternating current (AC) voltage and the startup capacitor has a capacitance to allow the startup capacitor to provide sufficient energy to the controller to allow the controller to operate for up to a first time period equivalent to one period of the AC voltage.

10. The lighting system of claim 1 wherein the dropout immunity capacitor has a capacitance to allow the dropout capacitor to provide sufficient energy to the controller to allow the controller to operate for up to a second time period equivalent to N periods of the AC voltage, and N is a real number greater than one.

11. The lighting system of claim 10 wherein a value of N is sufficient to allow the controller to normally operate during a dropout of the first voltage source to accommodate a dimming on random switching ("DORS") dimming operation.

12. A method comprising:
   providing sufficient energy to a controller from a startup capacitor to allow the controller to begin normal operation prior to a dropout immunity capacitor having sufficient energy to provide to the controller to allow the controller to operate normally;
   providing sufficient energy to the controller from the dropout immunity capacitor for a period of time when a first voltage source provides insufficient power to allow the controller to continue normal operation, wherein a capacitance of the dropout immunity capacitor is greater than a capacitance of the startup capacitor;
   generating a control signal with the controller;
   providing the control signal to a switching power converter to control power output of the switching power converter; and
   providing power from the switching power converter to one or more light emitting diodes coupled to the switching power converter.

13. The method of claim 12 further comprising:
   preventing the dropout immunity capacitor from charging until the startup capacitor is able to provide sufficient energy to the controller to allow the controller to begin normal operation.

14. The method of claim 12 further comprising:
   generating a control signal to control a switch coupled to the dropout immunity capacitor to control charging of the dropout immunity capacitor.

15. The method of claim 12 wherein the capacitance of the dropout immunity capacitor is approximately 10 times greater than the capacitance of the startup capacitor.

16. The method of claim 12 wherein the startup capacitor is configured to couple to a second voltage source and the second voltage source generates an alternating current (AC) voltage, the method further comprising:

providing sufficient energy to the controller from the startup capacitor to allow the controller to operate for up to a first time period equivalent to one period of the AC voltage.

17. The method of claim 12 wherein providing sufficient energy to the controller from a dropout immunity capacitor for a period of time further comprises:
providing sufficient energy to the controller from the dropout immunity capacitor to allow the controller to operate for up to a second time period equivalent to N periods of the AC voltage, and N is a real number greater than one.

18. The method of claim 17 wherein a value of N is sufficient to allow the controller to normally operate during a dropout of the first voltage source to accommodate a dimming on random switching ("DORS") dimming operation.

19. A lighting system comprising:
means for providing sufficient energy to a controller from a startup capacitor to allow the controller to begin normal operation prior to a dropout immunity capacitor having sufficient energy to provide to the controller to allow the controller to operate normally;
means for providing sufficient energy to the controller from the dropout immunity capacitor for a period of time when a first voltage source provides insufficient power to allow the controller to continue normal operation, wherein a capacitance of the dropout immunity capacitor is greater than a capacitance of the startup capacitor;
means for generating a control signal with the controller;
means for providing the control signal to a switching power converter, coupled to the controller, to control power output of the switching power converter;
means for providing power from the switching power converter to means for generating light coupled to the switching power converter; and
the means for generating light coupled to the switching power converter.

* * * * *